June 14, 1949.  H. O. LINDGREN  2,473,379
TEAT CUP
Filed March 30, 1945
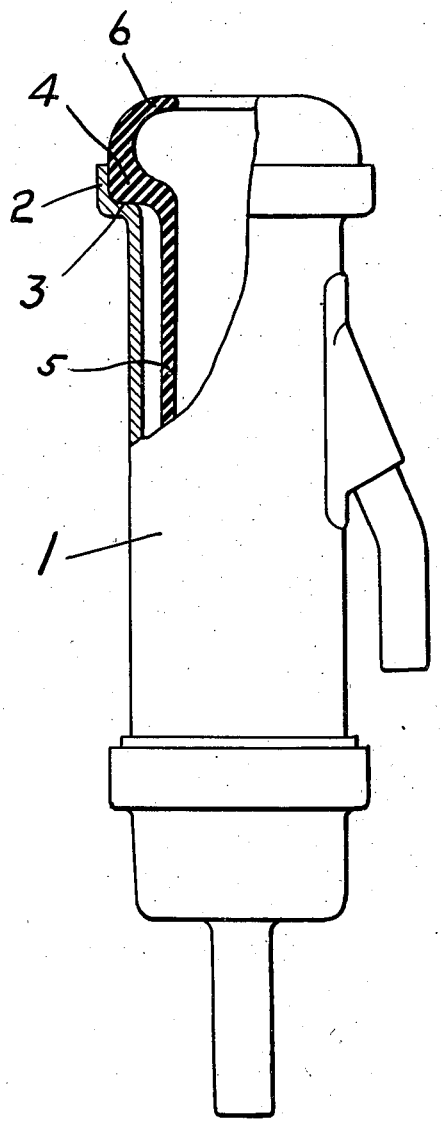
WITNESS:
Rob. R. Kitchel
INVENTOR
Hans Olof Lindgren
BY
Busser and Harding
ATTORNEYS.

Patented June 14, 1949

2,473,379

UNITED STATES PATENT OFFICE 2,473,379

TEAT CUP

Hans Olof Lindgren, Appelviken, Sweden, assignor to Aktiebolaget Separator, Stockholm, Sweden, a corporation of Sweden Application March 30, 1945, Serial No. 585,769
In Denmark December 9, 1943

1 Claim. (Cl. 31—85)

With teat cups it is desired that the teat cup lining be inserted in the teat cup shell under axial tension. It is known in the art to force a metal ring of a larger diameter than the rubber lining into the upper part of same in such a way that the upper part of the lining is bent nearly radially inwards after the insertion of the metal ring. Thus there is formed at the upper part of the lining a widened portion which is placed on an internal shoulder in the teat cup shell.

When using the arrangement in question a considerable elasticity of the rubber material is, however, required. When same has after some time of use become brittle it is likely to be ruptured when the metal ring is inserted.

In my invention I provide a rigid teat cup shell of known construction, including a main, usually cylindrical, body and an enlarged upper portion joined to the shell by a flat shoulder. The lining (or liner as it is generally designated) comprises a main, approximately cylindrical, flexible and elastic body of substantially smaller diameter than the shell body (as is usual in the art) and an enlarged upper portion of substantially greater thickness than that of the body of the liner and which extends outward above the shell shoulder and firmly seats within the enlarged end of the shell. This thickened enlarged portion has a flat lower face so as to firmly contact with the shoulder throughout substantially its width and has also a peripheral face firmly fitting the shell annulus above the shell shoulder. Preferably, also, the liner is prolonged above its shell-contacting thickened portion, extending therebeyond upward and inward to approximately the diameter of the body of the liner so as to form an enlarged interior and embrace the teat.

The accompanying drawing shows an embodiment of the invention.

The tubular teat cup shell, of metal or other rigid material, is at its upper end provided with a widened portion 2 connected with the main body of the shell by a flat shoulder 3. The liner 5, which is of flexible and elastic material, usually rubber, comprises a main, approximately cylindrical, body and an enlarged upper portion 4 which fits within the enlarged upper end of the shell. An essential feature of the construction is that the enlarged upper, shell-engaging portion of the liner shall be substantially thicker than the main body of the liner. This enlarged thickened upper portion of the liner is of such ample dimensions that the rubber liner can be stretched out to the degree required without danger of the stretching effecting any disengagement of the liner from the shoulder at the enlarged end of the shell. Nor when, in the operation of the teat cup, the annular space between the main body of the liner and the main body of the shell is subjected to a partial vacuum, is there danger of the upper part of the liner loosening its grip upon the shouldered part of the shell around the whole or any part of its circumference.

Above the thickened part of the liner, the wall 6 thereof extends upward and inward to form an annular hollow space, the extremity of the liner embracing the root of the teat during operation.

What I claim and desire to protect by Letters Patent is:

In a teat cup for milking machines, the combination, with a rigid shell having a cylindrical main portion and a larger cylindrical extension joined to the main portion by an annulus the upper face of which is of a width substantially greater than the thickness of the shell body and substantially greater than the thickness of the body of the below-specified liner, of a flexible liner having an approximately cylindrical body portion of a diameter substantially smaller than that of the main portion of the shell and a relatively thick annular portion the inner part of which is spaced from said annular portion of the shell and the outer part of which extends above the annulus of the shell inside the cylindrical extension and thence upward and inward substantially above the upper edge of said cylindrical extension to a diameter approaching that of the body portion, the relatively thick annular portion of the liner having along its bottom and along its outer wall a tight contacting fit with the annulus and larger cylindrical extension of the shell.

HANS OLOF LINDGREN.

REFERENCES CITED

The following references are of record in the file of this patent:

UNITED STATES PATENTS

| Number | Name | Date |
|---|---|---|
| 1,024,847 | Gillies | Apr. 30, 1912 |
| 1,246,292 | Macartney | Nov. 13, 1917 |
| 1,888,226 | Hogeland | Nov. 22, 1932 |
| 2,055,718 | Davis | Sept. 29, 1936 |
| 2,120,556 | Greene | June 14, 1938 |
| 2,219,945 | Scott | Oct. 29, 1940 |
| 2,402,094 | Shurts et al. | June 11, 1946 |

FOREIGN PATENTS

| Number | Country | Date |
|---|---|---|
| 550,010 | Great Britain | Dec. 17, 1942 |
| 550,517 | Great Britain | Jan. 12, 1943 |